Patented Oct. 9, 1934

1,976,088

UNITED STATES PATENT OFFICE 1,976,088

SAUSAGE MOLD

Ewald F. Pawsat, Maysville, Ky., assignor to Wald Manufacturing Company, Incorporated, a corporation of Kentucky Application February 2, 1933, Serial No. 654,873

1 Claim. (Cl. 100—57)

My invention relates to molds for the manufacture of sausage and similar food products.

The principal object of the present invention is to provide a simple and inexpensive mold, form or basket within which a sausage or similar food product, the filling having been placed in the case or skin of said product, may be clamped and held during the smoking or other process to which the same is subjected.

A further object of said invention is to provide a mold of the type mentioned having a simplified interlocking means for closing the mold after the sausage or similar product has been placed therein and securely retaining same during the further processing of said product.

Further objects of my invention will appear from the following detailed description thereof:

Figure 1:
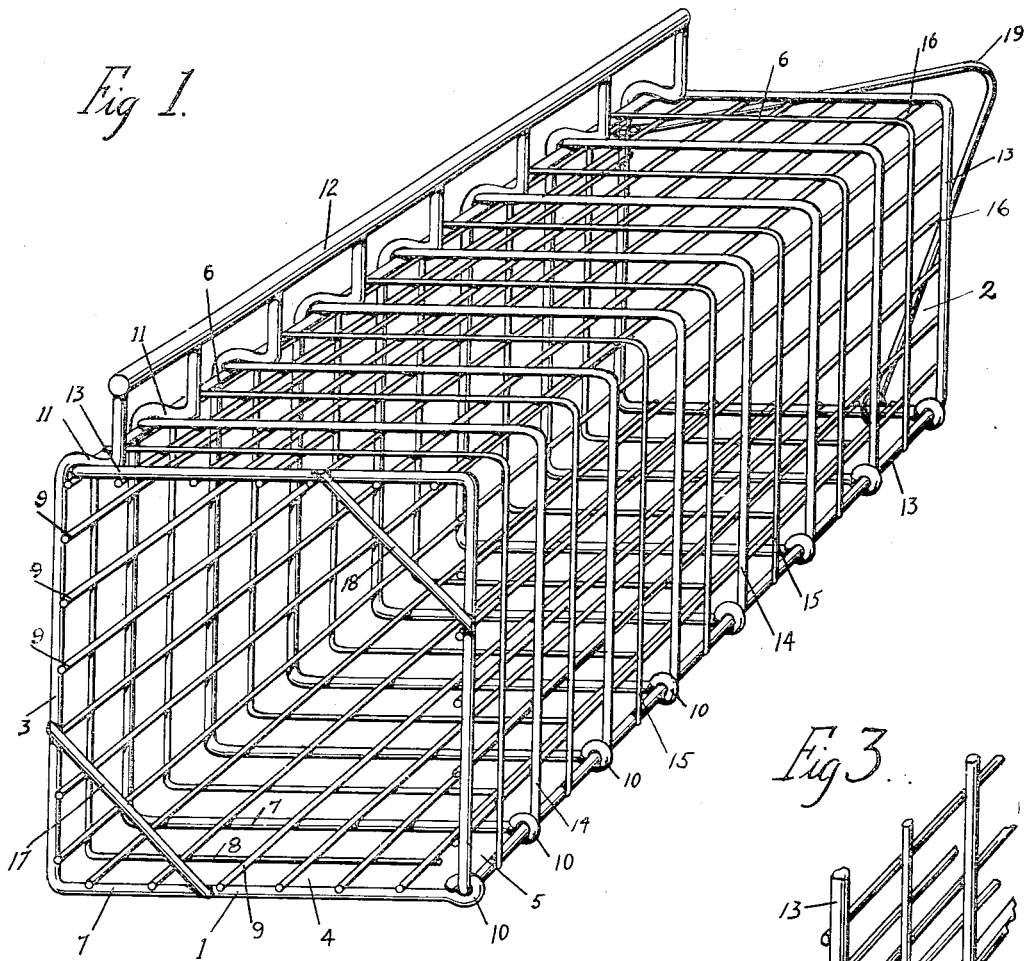
Figure 1 is a perspective of a sausage mold constructed in accordance with this invention.
Figure 3:
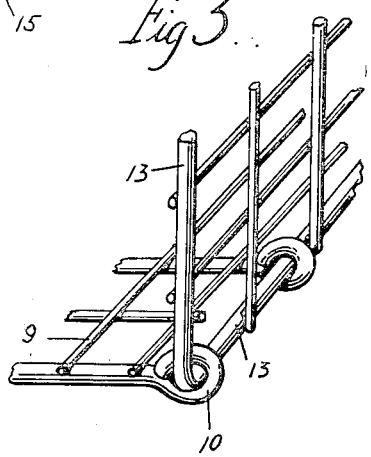
Figure 3 is a perspective of a portion of the hinged connection between the elements of my new sausage mold.
Figure 2:
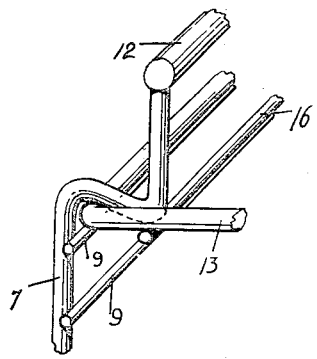
Figure 2 is a perspective of a portion of the interlocking closure.

The numeral 1 indicates generally one of the two sections of which my device is constructed. The numeral 2 indicates generally the other section of the mold. The sections 1 and 2 are rectangular as shown, the section 1 providing sides 3 and 4, and the section 2 providing the complementary sides 5 and 6 of the device.

The section 1 is constructed of a series of rectangularly bent wires 7 and 8 disposed in alternate arrangement, the wires 7 being of heavier gauge than the wires 8. These rectangular wires 7 and 8 are disposed in series as shown clearly in Figure 1 and are secured together by means of longitudinal wires 9 which are spot welded, soldered or otherwise secured to the wires 7 and 8 at the intersections. Each of the wires 7 is provided at one of its terminals with a loop or eye 10, said eyes being adapted to serve as one of the elements of the hinged connection between the two sections of the mold. The other ends of said wires 7 are bent inwardly and slightly downward to provide locking shoulders 11, the terminal portions of said wires beyond said shoulders being bent outwardly and parallel with the wall 3 as clearly shown in Figure 1. The free ends of the wires 7 beyond the shoulders are united by means of a heavy wire 12 which is spot welded thereto.

The section 2 is constructed of a frame wire 13 which extends entirely around the two sides of said section, and said section is further composed, within said frame, of heavy transverse wires 14, light transverse wires 15, and longitudinal wires 16, said wires being spot welded or otherwise secured together at their intersections. The wire 13 along one edge of the section 2 is pivotally secured in the eyes 10 of the section 1 so that the two sections are adapted to move relatively to each other for opening and closing. When closed the wire 13 along the other edge of section 2 is adapted to fit under the shoulders 11 of section 1, said sections being thus interlocked.

Secured to the base wire 7 of the section 1 is a diagonal wire 17, a similar wire 18 being secured diagonally across the corner of wire 13. Said wires 17 and 18 are adapted to serve as bottom wires for the mold to retain the sausage or other product therein against downward slippage. A bail 19 is secured diagonally across the angle of wire 7 at the other end of the mold.

From the foregoing description the nature and use of my new invention will be apparent to those skilled in the art to which the same appertains.

When it is desired to place a sausage or other product in the mold, the sections are opened by springing the section 2 out from under the shoulders 11 of section 1; the other section is then permitted to pivot in the eyes 10. In this act the heavy wire 12 is used as a pressure bar to be engaged preferably by the thumbs, while the wire 13 of section 2 is forced from under the shoulders. The sausage having been properly disposed in the sections they are closed, the section 2 being interlocked under the shoulders as shown in Figure 1. The device may then be suspended by the bail 19 in the usual manner, the sausage being prevented from slipping downwardly out of the mold by means of the wires 17 and 18.

Having thus fully described my invention, what I claim as new and desire to secure by Letters Patent is:

A mold of the character specified comprising two rectangular sections, one of said sections consisting of alternating heavy and light gauge transverse wires and intersecting longitudinal wires, eyes formed in the ends of the heavy transverse wires along one edge of said section, locking shoulders formed near the other ends of said heavy transverse wires, said wires having terminal sections extending outwardly beyond said shoulders, and a longitudinal pressure bar secured to the ends of the respective terminal sections, the other section consisting of a wire frame having intersecting wires therein, one side of said frame being secured in said eyes and the other side being adapted to be engaged by said shoulders inside said pressure bar, whereby interlocking and disengagement of said sections are facilitated.

EWALD F. PAWSAT.